(12) United States Patent
Downing, Jr. et al.

(10) Patent No.: US 7,314,898 B2
(45) Date of Patent: Jan. 1, 2008

(54) MICROSPHERE-FILLED POLYTETRAFLUOROETHYLENE COMPOSITIONS

(75) Inventors: James W. Downing, Jr., Woolwich Township, NJ (US); Kenji Nagai, Sobudai Zama (JP); Makoto Nagase, Hachioji (JP); Katsuhiko Nakazato, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 175 days.

(21) Appl. No.: 11/025,183

(22) Filed: Dec. 29, 2004

(65) Prior Publication Data

US 2006/0142468 A1    Jun. 29, 2006

(51) Int. Cl.
*C08L 27/18* (2006.01)
*C08K 3/40* (2006.01)
*C08J 9/32* (2006.01)

(52) U.S. Cl. .................. 524/546; 524/545; 524/493; 524/494; 524/847; 428/402; 523/218; 523/219

(58) Field of Classification Search ............. 524/545, 524/493, 494, 567, 546, 847
See application file for complete search history.

(56) References Cited

U.S. PATENT DOCUMENTS

| | | | |
|---|---|---|---|
| 3,524,794 A | | 8/1970 | Jonnes et al. |
| 3,629,219 A | * | 12/1971 | Esker ...................... 526/81 |
| 3,911,072 A | * | 10/1975 | Saito et al. ............... 264/117 |
| 3,981,853 A | * | 9/1976 | Manwiller ............... 526/255 |
| 3,983,200 A | * | 9/1976 | Browning ............... 264/117 |
| 4,102,966 A | * | 7/1978 | Duperray et al. ........... 264/112 |
| 4,267,237 A | * | 5/1981 | Duperray et al. ........... 428/422 |
| 4,391,646 A | | 7/1983 | Howell |
| 4,391,930 A | * | 7/1983 | Olson ..................... 523/219 |
| 4,580,790 A | | 4/1986 | Doose |
| 4,767,726 A | | 8/1988 | Marshall |
| 4,812,367 A | | 3/1989 | Bickle |
| 4,900,629 A | * | 2/1990 | Pitolaj .................... 428/422 |
| 4,914,158 A | * | 4/1990 | Yoshimura et al. ........ 525/199 |
| 4,961,891 A | | 10/1990 | Pitolaj |
| 5,055,342 A | * | 10/1991 | Markovich et al. ........ 428/137 |
| 5,141,972 A | * | 8/1992 | Sato ....................... 523/218 |
| 5,194,459 A | | 3/1993 | Sato et al. |
| 5,209,967 A | * | 5/1993 | Wright et al. ............ 428/317.9 |
| 5,348,990 A | | 9/1994 | Walpita et al. |
| 5,354,611 A | * | 10/1994 | Arthur et al. ............. 428/325 |
| 5,429,869 A | * | 7/1995 | McGregor et al. ......... 428/364 |
| 5,559,170 A | | 9/1996 | Castle |
| 5,560,986 A | * | 10/1996 | Mortimer, Jr. ........... 428/308.4 |
| 5,677,031 A | * | 10/1997 | Allan et al. ............... 428/137 |
| 5,738,936 A | * | 4/1998 | Hanrahan ................ 428/313.5 |
| 5,916,671 A | * | 6/1999 | Dauber et al. ............ 428/317.3 |
| 5,922,453 A | | 7/1999 | Horn, III et al. |
| 6,172,134 B1 | | 1/2001 | Cooke |
| 6,218,015 B1 | * | 4/2001 | Allen et al. ............... 428/422 |
| 6,357,755 B1 | | 3/2002 | Feistel |
| 6,413,451 B1 | * | 7/2002 | Kawahara et al. ......... 264/15 |
| 6,482,519 B1 | | 11/2002 | Schleifstein |
| 6,774,169 B1 | * | 8/2004 | Asano et al. ............. 524/377 |
| 7,022,404 B2 | * | 4/2006 | Sethumadhavan et al. .................. 428/295.1 |
| 2002/0183451 A1 | * | 12/2002 | Sukegawa et al. ......... 525/190 |
| 2004/0033905 A1 | | 2/2004 | Shinbach et al. |

FOREIGN PATENT DOCUMENTS

| | | |
|---|---|---|
| EP | 0 442 363 A | 8/1991 |
| EP | 1 566 583 A | 8/2005 |
| GB | 2 265 627 | 10/1993 |
| JP | 51-130451 | * 11/1976 |
| JP | 10-045989 | 2/1998 |
| JP | 2001-064544 | 3/2001 |
| WO | WO 94/02547 | 2/1994 |

OTHER PUBLICATIONS

JP 51-130451 (abstract in English).*
Ebnesajjad, Sina, "Fluoroplastics vol. 1 Non-Melt Processible Fluoroplastics," *PDL Handbook Series*, Chapters 5, 7, and 8, (2000) pp. 33-58, 76-134, and 135-167.

* cited by examiner

*Primary Examiner*—David W. Wu
*Assistant Examiner*—Rip A Lee
(74) *Attorney, Agent, or Firm*—Brian E. Szymanski

(57) ABSTRACT

The present invention is a composition that includes granular-grade polytetrafluoroethylene and a plurality of microspheres, where the plurality of microspheres have an average specific gravity less than about 0.9 grams per cubic centimeter.

18 Claims, No Drawings

MICROSPHERE-FILLED POLYTETRAFLUOROETHYLENE COMPOSITIONS

CROSS-REFERENCE TO RELATED APPLICATION(S)

None.

BACKGROUND OF THE INVENTION

The present invention generally relates to filled fluoropolymer compositions. In particular, the present invention relates to microsphere-filled polytetrafluoroethylene (PTFE) compositions, and methods of forming articles from microsphere-filled PTFE compositions.

PTFE is a fluoropolymer that exhibits good chemical resistance, a low coefficient of friction, a low dielectric constant, a broad service temperature range, and good tensile strengths. As such, PTFE is suitable for use in a variety of industrial applications, such as sealant and gasket materials. PTFE exhibits a high molecular weight (e.g., about $1.0 \times 10^6$ grams/mol to about $1.0 \times 10^8$ grams/mol), and demonstrates a high melt viscosity (about $1.0 \times 10^{11}$ Poise) above its initial crystalline melting point of about 342° C. The subsequent melting point (after initial melting and cooling) is about 327° C. Due to these characteristics, PTFE is generally non-melt processable and conventional thermoplastic processing methods may not be employed. Therefore, alternative techniques are required to process PTFE, which generally define the grade of PTFE.

PTFE materials suitable for use as gasket materials typically come in two grades: fine-powder-grade PTFE and granular-grade PTFE. Fine-powder-grade PTFE and its derivate compounds generally require the use of paste extrusion techniques to create a sheet form from which specific gasket geometries may be stamped or cut. Paste extrusion involves specific, expensive machinery and volatile solvents in order to process the fine-powder-grade PTFE. Moreover, fine-powder-grade PTFE is typically calendared to densify the produced sheet, which constitutes an additional processing step. As such, it is generally expensive and time consuming to manufacture gaskets and other sealants from fine-powder-grade PTFE.

Granular-grade PTFE may also be used as a gasket material. However, the mechanical properties of granular-grade PTFE are generally inferior to the mechanical properties of fine-powder-grade PTFE. Nonetheless, granular-grade PTFE may be processed by compression molding and skiving of large billets, or cylinders, which is less expensive than paste extrusion. In contrast, fine-powder-grade PTFE is generally not processsable by compression molding, and is limited to the more expensive paste extrusion process.

Fine-powder-grade PTFE and granular-grade PTFE each exhibit several limitations, such as poor dimensional stability and high compression ratios. These factors typically result in low yields and reduced product lives. Filler materials are typically used to increase the dimensional stability and reduce the compression ratios. However, filler materials generally reduce the tensile strengths of the produced gaskets, which correspondingly reduces the resistance of the produced gaskets against tearing or other shear force. As such, there is a need for a PTFE composition that exhibits good dimensional stability, low compression ratios, good tensile strengths, and is inexpensive to produce.

BRIEF SUMMARY OF THE INVENTION

The present invention is directed to a composition that includes granular-grade polytetrafluoroethylene and a plurality of microspheres, where the plurality of microspheres have an average specific gravity less than about 0.9 grams per cubic centimeter.

The present invention is further directed to a composition that includes granular-grade polytetrafluoroethylene and a plurality of microspheres, where the plurality of microspheres exhibit an average crush strength-to-density ratio of at least about 100 megapascals-cubic centimeters/gram.

The present invention is further directed to a method of forming an article. The method includes providing a composition that includes granular-grade polytetrafluoroethylene and a plurality of microspheres, where the plurality of microspheres have an average specific gravity less than about 0.9 grams per cubic centimeter. The method further includes compression molding the composition to form a compressed composition, and sintering the compressed composition to form the article.

DETAILED DESCRIPTION

The present invention encompasses a composition that includes granular-grade PTFE and a plurality of low-density microspheres. The composition is compression moldable and sinterable, and may be used to manufacture a variety of articles. As discussed below, examples of suitable articles manufactured from the composition of the present invention include machined parts, seals, gaskets, tubing, valve components, and pump components. The manufactured articles exhibit good dimensional stability, low compression ratios, high compressive strengths, low coefficients of thermal expansion (COTE), low densities (i.e., low specific gravities), and are inexpensive to manufacture. As such, the composition of the present invention is particularly suitable for use as a material for gasket articles.

The granular-grade PTFE allows the manufactured articles to exhibit good chemical resistance, low coefficients of friction, low dielectric constants, broad service temperature ranges, and good tensile strengths. The term "granular-grade PTFE" herein refers to PTFE that is formed by suspension polymerization and is compression moldable. The granular-grade PTFE may be a homopolymer of tetrafluoroethylene (TFE), or a copolymer of TFE and less than about 2.0% by weight of other monomers, based on the total weight of the granular-grade PTFE. Copolymers are typically referred to as to as "modified PTFE" or "TFM" (e.g., trade designated DYNEON TFM, which is available from Dyneon, LLC, Oakdale, Minn.). An example of a suitable monomer for use with TFE in the copolymer includes perfluoropropylvinylether.

The granular-grade PTFE may be initially formed by suspension polymerization to obtain agglomerate particles having large average particle sizes (e.g., about 800 micrometers). The agglomerate particles may then be reduced in size by milling to obtain suitable particle sizes for the granular-grade PTFE. Examples of suitable average particle sizes for the granular-grade PTFE range from about 5 micrometers to about 500 micrometers. Examples of particularly suitable average particle sizes for the granular-grade PTFE range from about 10 micrometers to about 50 micrometers.

Examples of suitable granular-grade PTFE include granular free-flow PTFE, granular semi-free flow PTFE, granular non-free-flow (standard-flow) PTFE, derivatives thereof, and combinations thereof. Commercially available examples of suitable granular-grade PTFE include trade designated DYNEON TF 1620 PTFE, DYNEON TF 1641 PTFE, DYNEON TF 1645 PTFE, DYNEON TF 1750 PTFE, DYNEON TFM 1600 PTFE, DYNEON TFM 1700 PTFE, DYNEON TFM 1705 PTFE, DYNEON TFM X 1630 PTFE, DYNEON TFR 1105 PTFE, and DYNEON TFR 1502 PTFE, all of which are available from Dyneon, LLC, Oakdale, Minn.

The low-density microspheres are blended with the granular-grade PTFE to form the composition of the present invention. Examples of suitable materials for the low-density microspheres include microspheres derived from glass, silica, ceramics, derivatives thereof, and combinations thereof. The low densities of the low-density microspheres allow manufactured articles to be correspondingly less dense compared to conventional PTFE articles. This provides easier handling of the manufactured articles, especially large sheets and billets (i.e., cylinders). Examples of suitable average specific gravities for the low-density microspheres include specific gravities of less than about 0.9 grams/cubic centimeter ($g/cm^3$). Examples of particularly suitable average specific gravities for the low-density microspheres range from about 0.1 $g/cm^3$ to about 0.8 $g/cm^3$.

Examples of suitable average particle sizes of the low-density microspheres range from about 10 micrometers to about 70 micrometers, which allow the low-density microspheres to exhibit a high flowability with the granular-grade PTFE. As discussed below, the high flowability allows the composition of the present invention to be charged to a mold in a substantially uniform manner with little or no clumping or agglomerations.

The low-density microspheres also desirably exhibit good resistances to crushing to provide high survival rates while forming the composition of the present invention. Examples of suitable average crush strengths for the low-density microspheres include at least about 69 megapascals (MPa) (about 10,000 pounds/$inch^2$ (psi)). Examples of particularly suitable average crush strengths for the low-density microspheres include at least about 117 MPa (about 17,000 psi). Average crush strengths used herein are measured pursuant to ASTM D3102-72, with the exception that the sample size of the low-density microspheres is 10 milliliters, the low-density microspheres are dispersed in 20.6 grams of glycerol, and the data reduction is automated using computer software. The value reported is the hydrostatic pressure at which 10% by volume of the low-density microspheres collapse (i.e., 90% survival).

The low-density microspheres also desirably exhibit good average crush strength-to-density ratios. This provides manufactured articles that are both light weight and exhibit good compressive strengths. The average crush strength-to-density ratio of the low-density microsphere is calculated by dividing the average crush strength of the low-density microspheres by the average specific gravity of the low-density microspheres:

$$\text{Average crush strength-to-density ratio} = \frac{(\text{Average crush strength})}{(\text{Average specific gravity})}$$

As discussed above, the average specific gravity is measured pursuant to ASTM D792-00, and the average crush strength is measured pursuant to ASTM D3102-72 with the exceptions discussed above. Examples of suitable average crush strength-to-density ratios for the low-density microspheres include at least about 100 MPa-cubic centimeters/gram ($MPa\text{-}cm^3/g$). Examples of suitable average crush strength-to-density ratios for the low-density microspheres include at least about 200 $MPa\text{-}cm^3/g$. The units for the average crush strength-to-density ratios listed herein are not reduced to the lowest SI unit denominations for the sake of clarity and to reduce the number of required calculations. Because the average crush strength-to-density ratio is a ratio of pressure/specific gravity, the actual units used are immaterial so long as the units used are analogous to $MPa\text{-}cm^3/g$.

Examples of particularly suitable low-density microspheres include soda-lime-borosilicate glass microspheres commercially available from 3M Corporation, St. Paul, Minn., under the trade designations 3M SCOTCHLITE S60 microspheres and 3M SCOTCHLITE S60HS microspheres. The S60 microspheres exhibit an average specific gravity of about 0.6 $g/cm^3$, an average crush strength of about 69 MPa (about 10,000 psi), and an average crush strength-to-density ratio of about 115 $MPa\text{-}cm^3/g$. The S60HS micro spheres exhibit an average specific gravity of about 0.6 $g/cm^3$, an average crush strength of about 124 MPa (about 18,000 psi), and an average crush strength-to-density ratio of about 207 $MPa\text{-}cm^3/g$. The use of the S60HS microspheres with non-PTFE materials is disclosed in U.S. Patent Application Ser. Nos. 60/533,320, 60/533,348, and 60/555,215.

All concentrations herein are expressed in weight percent, unless otherwise stated. Suitable component concentrations in the composition of the present invention range from about 55% to about 99% of the granular-grade PTFE and from about 1% to about 45% of the low-density microspheres, based on the total compositional weight of the composition of the present invention. Particularly suitable component concentrations in the composition of the present invention range from about 70% to about 80% of the granular-grade PTFE and from about 20% to about 30% of the low-density microspheres, based on the total compositional weight of the composition of the present invention. Those skilled in the art will appreciate suitable component concentration ranges for obtaining comparable physical properties of the manufactured articles.

The composition of the present invention may also include additional materials in varying concentrations as individual needs may require. For example, the composition of the present invention may further include pigments, antioxidants, UV stabilizing agents, reinforcing agents, other fillers (organic and inorganic), and combinations thereof.

The composition of the present invention may be made with a variety of blending techniques. Because the granular-grade PTFE and the low-density microspheres exist as particulates at ambient temperatures and pressures, an example of a suitable process for making the composition of the present invention includes a two-step blending process. The first step involves combining the low-density microspheres with the granular-grade PTFE and premixing them in a container for several minutes until visually blended. The second step involves further blending the premixed composition with a high-intensity mixer until the composition is substantially homogenous (i.e., the low-density microspheres are substantially dispersed between the particles of the granular-grade PTFE). An example of a suitable high-intensity mixer includes a trade designated ASC TORNADO industrial agitator, which is commercially available from Abbottstown Stamping Company, Inc., Abbottstown, Pa.

Substantial homogeneity of the composition may be determined in a variety of manners. For example, the extent of the blending may be visually inspected with light microscopy. Alternatively, portions of the composition may be molded to form articles, and the densities of the articles may be compared. If the articles exhibit varying densities, the composition is not substantially homogenous. If the composition is determined to not be substantially homogenous, then subsequent blending steps may be used. Once the composition is blended until substantially homogenous, the composition is ready for use to form articles.

During the blending process, the granular-grade PTFE and the low-density microspheres are subjected to high levels of stress. Nonetheless, after the blending process discussed above, substantially all of the low-density microspheres of the composition of the present invention remain intact, as identified by a visual microscopy inspection. The high survival rate of the low-density microspheres is believed to be due to the high average crush strengths exhibited by the low-density microspheres. This allows the composition of the present invention to be blended under intense blending conditions to obtain substantial homogeneity.

Compositions of the present invention that include free-flow granular PTFE may be further processed with conventional techniques, such as a series of solvent addition, agglomeration, densification, solvent removal, and agglomerate classification (i.e., removal of oversized and fine particles).

The present invention also encompasses methods of forming articles from the above-discussed compositions. Examples of suitable methods of forming the articles include any method of forming articles-from granular-grade PTFE compounds, such as compression molding, sintering, and subsequent machining (e.g., skiving). An example of a suitable compression molding process includes compacting the composition into performed dimensions with a compression mold, such as a hydraulic press. As discussed above, the small particle sizes of the granular-grade PTFE and low-density microspheres provides for high flowability and uniform charging of the composition into the compression molding system. This reduces effects of clumping and agglomeration, which otherwise reduce the physical properties of the manufactured articles. Suitable pressures for compression molding range from about 13.8 megapascals (MPa) (about 2,000 pounds/inch$^2$ (psi)) to about 82.7 MPa (about 12,000 psi). The compression pressure may be applied in one direction (i.e., automatic compression molding) or from all sides (i.e., isostatic compression molding). The compacted composition may also be sintered while retained in the compression mold by applying heat to consolidate the composition at a temperature above the crystalline melting point of the composition. Examples of suitable sintering conditions include heating the compacted composition at a temperature of about 370° C. This may then be followed by a cooling step. Additionally, after processing the composition into a sintered article, the article exhibits a bright white color that is aesthetically pleasing.

The composition of the present invention is also free sinterable, which means that the performed composition may be removed from the compression mold and placed in a sintering oven without the compression mold, and heated (i.e., the composition is capable of being sintered without having the compression mold on it). Free sintering increases the versatility of the composition of the present invention to be manufactured with a variety of molding systems.

Compression molding followed by sintering may be used to form the final articles, or may be used to form intermediary articles that undergo subsequent machining. Examples of intermediary articles that may be formed from the composition of the present invention include billets (i.e., cylinders) that may be subsequently skived (i.e., sliced and peeled) to form films and sheets from the billets. The composition of the present invention also forms articles that are dimensionally stable. As such, in contrast to conventional PTFE articles, billets formed from the composition exhibit low shrinkage in the central portions of the articles (i.e., there is a low shrinkage gradient or "hourglassing" effect). This results in greater yields during skiving and also allows compression molding of articles substantially to desired sizes without requiring subsequent machining steps.

As discussed above, the composition of the present invention may be used to form a variety of articles. The manufactured articles are light weight due to the low density of the composition. In one embodiment of the present invention, the manufactured articles may exhibit specific gravities of less than about 1.0 g/cm$^3$. The low densities, along with the resistance to weathering provided by the granular-grade PTFE, allows such articles to be suitable as floatation devices (e.g., buoys) for use in a variety of extreme environmental conditions (e.g., heat and chemical exposure). The average specific gravities for the PTFE/microsphere articles used herein are measured pursuant to ASTM D792-00.

The granular-grade PTFE also allows the manufactured articles to exhibit low dielectric constants. This allows articles formed from the composition of the present invention to function as insulating layers for electrical wires and cables. Wires and cables may also be subjected to extreme environmental conditions and such articles would also benefit from the properties of the granular-grade PTFE.

Articles formed from the composition of the present invention also exhibit good compressive strengths. This allows articles formed from the composition of the present invention to withstand high levels of compressive forces. This again allows such articles to be particularly suitable as gasket materials, which are generally disposed between pairs of adjacent components, and may be subjected to high compression levels. Examples of suitable compressive strengths pursuant to ASTM D695-02 include at least about 19.3 MPA (about 2,800 psi) and examples of suitable compressive modulus pursuant to ASTM D695-02 include at least about 300 MPA (about 44,000 psi).

Articles formed from the composition of the present invention also exhibit good tensile strengths, allowing such articles to resist tearing and puncturing during use. Examples of suitable tensile strengths pursuant to ASTM D4745-01 include at least about 4.1 MPa (about 600 psi). The good tensile strengths are particularly useful for thin filmed articles. For example, articles formed from the composition of the present invention, which are machined to a thickness of about 1.3 millimeters, exhibit tensile strengths of at least about 2.4 MPa (about 350 psi). Thus, the composition of the present invention may be used to form thin articles that are durable and may be used with a variety of industrial applications.

Property Analysis and Characterization Procedures

Various techniques are available for manufacturing and characterizing the compositions of the present invention. Several of the techniques are employed herein. An explanation of these techniques follows.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following compositional abbreviations are used in the following Examples:

"TF 1750": Granular-grade PTFE commercially available under the trade designation DYNEON TF 1750 PTFE from Dyneon, LLC, Oakdale, Minn.

"TF 1620": Granular-grade PTFE commercially available under the trade designation DYNEON TF 1620 PTFE from Dyneon, LLC, Oakdale, Minn.

"TFM 1700": Granular-grade modified PTFE commercially available under the trade designation DYNEON TFM 1700 PTFE from Dyneon, LLC, Oakdale, Minn.

"S60 microspheres": Soda-lime-borosilicate glass microspheres commercially available under the trade designation 3M SCOTCHLITE S60 microspheres from 3M Company, St. Paul, Minn.

"S60HS microspheres": Soda-lime-borosilicate glass microspheres commercially available under the trade designation 3M SCOTCHLITE S60HS microspheres from 3M Company, St. Paul, Minn.

"Top-Chem-2000": PTFE gasket material commercially available under the trade designation KLINGER TOP-CHEM-2000 gasket material from Thermoseal, Inc., Sidney, Ohio.

"Sigma 500": PTFE gasket material commercially available under the trade designation SIGMA 500 gasket material from Flexitallic Group, Inc., Houston, Tex.

"Durlon 9000": PTFE gasket material commercially available under the trade designation DURLON 9000 gasket material from Gasket Resources, Inc. Exton, Pa.

"Sealon": PTFE Gasket material commercially available under the trade designation SEALON gasket material from Ameraflex Rubber & Gasket Co., Inc., Deer Park, Tex.

"Tealon 1580": PTFE gasket material commercially available under the trade designation TEALON 1580 gasket material from Teadit North America, Inc., Houston, Tex.

"Tealon 1590": PTFE gasket material commercially available under the trade designation TEALON 1590 gasket material from Teadit North America, Inc., Houston, Tex.

"Virg. PTFE": PTFE gasket material commercially available under the trade designation Virg. PTFE material from Chemplast USA, Fort Wayne, Ind.

Examples 1-6

Examples 1-6 are compositions of the present invention, with component concentrations (in weight percent) of granular-grade PTFE (e.g., TF 1750 and TFM 1700) and low-density microspheres (e.g., S60HS microspheres) as provided in Table 1. Articles were formed from by compression molding and sintering the compositions pursuant to the given ASTMs discussed below, except that the compression pressures were varied. Table 1 also provides the compression pressures used to compression mold the compositions of Examples 1-6.

TABLE 1

| Example | TF 1750 | TFM 1700 | S60HS | Compression Pressure (MPa) | Compression Pressure (psi) |
|---|---|---|---|---|---|
| Example 1 | 60 | 0 | 40 | 20.7 | 3000 |
| Example 2 | 60 | 0 | 40 | 68.9 | 10000 |
| Example 3 | 70 | 0 | 30 | 34.5 | 5000 |
| Example 4 | 70 | 0 | 30 | 68.9 | 10000 |
| Example 5 | 0 | 72 | 28 | 34.5 | 5000 |
| Example 6 | 0 | 72 | 28 | 68.9 | 10000 |

Articles formed from the compositions of examples 1-6 were quantitatively measured for tensile strength, tensile modulus, and/or tensile elongation. Table 2 provides the tensile strengths, as tested pursuant to ASTM D4745-01, for the articles formed from the compositions of Examples 1, 2, and 4-6. Table 3 provides the tensile moduli, as tested pursuant to ASTM D4745-01, for the articles formed from the compositions of Examples 3-6. Table 4 provides the tensile elongations, as tested pursuant to ASTM D4745-01, for the articles formed from the compositions of Examples 1-6.

TABLE 2

| Example | Tensile Strength (MPa) | Tensile Strength (psi) |
|---|---|---|
| Example 1 | 2.76 | 400 |
| Example 2 | 3.45 | 500 |
| Example 4 | 4.14 | 600 |
| Example 5 | 4.83 | 700 |
| Example 6 | 6.89 | 1000 |

TABLE 3

| Example | Tensile Modulus (MPa) | Tensile Modulus (psi) |
|---|---|---|
| Example 3 | 165 | 24,000 |
| Example 4 | 228 | 33,000 |
| Example 5 | 200 | 29,000 |
| Example 6 | 228 | 33,000 |

TABLE 4

| Example | Tensile Elongation (%) |
|---|---|
| Example 1 | 60% |
| Example 2 | 75% |
| Example 3 | 95% |
| Example 4 | 100% |
| Example 5 | 85% |
| Example 6 | 100% |

The data provided in Tables 2-4 illustrates the good tensile strengths, tensile moduli, and tensile elongations exhibited by articles formed from the compositions of the present invention. The combination of good tensile strengths and good tensile elongations show that the articles are tough, and may be used in a variety of industrial applications. In particular, the article formed from the composition of Example 6 exhibited a tensile strength of 6.89 MPa, a tensile modulus of 228 MPa, and a 100% tensile elongation. This is believed to be due in part to the use of TFM 1700, which exhibits beneficial physical properties.

Articles formed from the compositions of examples 1-6 were also quantitatively measured for specific gravity, hardness, and shrinkage. Table 5 provides the specific gravity (as tested pursuant to D792-00), the initial and 15 second hardness (as tested pursuant to D2240-04), and shrinkage (as tested pursuant to D4894-04) for the articles formed from the compositions of Examples 1-6.

TABLE 5

| Example | Specific Gravity | Hardness (initial) | Hardness (15 sec.) | Shrinkage (%) |
|---|---|---|---|---|
| Example 1 | <1.00 | 65 | 61 | 0.60% |
| Example 2 | 1.40 | 65 | 61 | 0.40% |
| Example 3 | 1.35 | 58 | 54 | 0.60% |
| Example 4 | 1.55 | 63 | 58 | 0.55% |
| Example 5 | 1.20 | 58 | 54 | 2.10% |
| Example 6 | 1.45 | 63 | 58 | 1.90% |

The data in Table 5 illustrates the low densities of the compositions of the present invention. As shown, the densities of the articles are proportional to the compression pressure, which is due in part to the level of compacting that occurs when compression molding the articles (i.e., the higher the compression pressure, the more compact the generally article becomes). The densities are also inversely proportional to the concentrations of the low-density microspheres. The higher concentrations of low-density microspheres cause the corresponding articles to be less dense as well.

The data in Table 5 also illustrates the good hardness and low shrinkage exhibited by the articles. The low shrinkage allows articles formed from the compositions of the present invention to substantially retain the desired dimensions when compression molded.

Articles formed from the compositions of examples 4 and 6 were quantitatively measured for compressive modulus and compressive strength. Table 6 provides the compressive moduli and compressive strengths, as tested pursuant to ASTM D695-02, for the articles formed from the compositions of Examples 4 and 6.

TABLE 6

| Example | Compressive Modulus (MPa) | Compressive Modulus (psi) | Compressive Strength (MPa) | Compressive Strength (psi) |
|---|---|---|---|---|
| Example 4 | 303 | 44,000 | 19.3 | 2800 |
| Example 6 | 427 | 62,000 | 20.7 | 3000 |

The data in Table 6 illustrates the good compressive moduli and compressive strengths the articles formed from the compositions of Examples 4 and 6. Accordingly, the compositions of the present invention are suitable for use in a variety of applications, such as sealant and gasket materials. In addition to exhibiting good tensile properties, as discussed above, the article formed from the composition of Example 6 also exhibited a high compressive modulus and compressive strength.

The compositions of Examples 4 and 6 were also tested for resistance to torque deformation at 25° C. and atmospheric pressure. Gasket samples with thicknesses and original dimensions provided in Table 7 were formed for the compositions of Examples 4 and 6, and for Comparative Examples A-G. The gaskets were installed in a 1-1/2 ANSI Class 150 flange and were torqued in four passes. The first, second, and third passes respectively applied 25 foot-pounds, 52 foot-pounds, and 76 foot-pounds of torque pressure. The gaskets were then left in the flange for three hours and a fourth pass to reachieve 76 foot-pounds torque pressure was applied. The gaskets were then left in the flange for one hour, and then removed from the flange and measured for the torqued dimensions. Table 7 provides the sample thicknesses, the original dimensions (inner diameter×outer diameter), the torqued dimensions (inner diameter×outer diameter), and the percent change between the original dimensions and the torqued dimensions for gaskets formed from the compositions of Examples 4 and 6 and Comparative Examples A-G.

TABLE 7

| Example | Product | Sample Thickness (inches) | Original dimensions (id × od) (inches) | Torqued dimensions (id × od) (inches) | Percent Change |
|---|---|---|---|---|---|
| Example 4 | — | 0.062 | 1.905 × 3.395 | 1.825 × 3.510 | 4.2% id × 3.4% od |
| Example 6 | — | 0.062 | 1.885 × 3.380 | 1.770 × 3.520 | 4.2% id × 3.4% od |
| Comparative Example A | Top-Chem-2000 | 0.062 | 1.890 × 3.403 | 1.880 × 3.412 | 0.5% id × 0.3% od |
| Comparative Example B | Sigma 500 | 0.070 | 1.880 × 3.400 | 1.690 × 3.480 | 10.1% id × 2.4% od |
| Comparative Example C | Durlon 9000 | 0.062 | 1.960 × 3.430 | 1.660 × 3.625 | 15.3% id × 5.7% od |
| Comparative Example D | Sealon | 0.062 | 1.960 × 3.430 | 1.660 × 3.625 | 15.3% id × 5.7% od |
| Comparative Example E | Tealon 1580 | 0.060 | 1.950 × 3.365 | 1.700 × 3.500 | 12.8% id × 4.0% od |
| Comparative Example F | Tealon 1590 | 0.055 | 1.915 × 3.375 | 1.756 × 3.511 | 8.3% id × 4.0% od |
| Comparative Example G | Virg. PTFE | 0.062 | 1.905 × 3.885 | 1.685 × 3.610 | 11.5% id × 7.1% od |

The data in Table 8 illustrates that articles formed from the compositions of the present invention exhibit the good resistances to applied torque. Gaskets for the compositions of Examples 4 and 6 each exhibited inner diameter percent changes of only 4.2% and outer diameter percent changes of only 3.4%. Only the gasket of Comparative Example A exhibited better torque results. However, Comparative Example A is Top-Chem-2000, which uses a fine-powder-grade PTFE. As discussed above, fine-powder-grade PTFEs require expensive extrusion processing systems to form products. In contrast, granular-grade PTFEs of the composition of the present invention may use compression molding and sintering, which are less expensive.

Articles formed from the compositions of Examples 4 and 6 were also quantitatively measured for coefficients of thermal expansion (COTE). Table 8 provides the COTE, as tested pursuant to ASTM E831-03, for the articles formed from the compositions of Examples 4 and 6 and Comparative Examples A and C-F.

provides the specific gravity (as tested pursuant to D792-00), shrinkage (as tested pursuant to D4894-04), tensile strengths and elongations (as tested pursuant to ASTM D4745-01), and hardness (as tested pursuant to D2240-04) for the articles formed from the compositions of Examples 7-10.

TABLE 10

| Example | Specific Gravity | Shrinkage (%) | Tensile Strength (MPa) | Tensile Elongation (%) | Hardness |
|---|---|---|---|---|---|
| Example 7 | 1.69 | 1.7 | 17.2 | 234 | 67 |
| Example 8 | 1.71 | 1.7 | 16.9 | 237 | 65 |
| Example 9 | 1.36 | 0.4 | 6.5 | 92 | 65 |
| Example 10 | 1.42 | 0.5 | 6.1 | 75 | 63 |

TABLE 8

| Example | Product | COTE (86-212 F.) (in./in.-F) | COTE (212-392 F.) (in./in.-F) | COTE (392-500 F.) (in./in.-F) |
|---|---|---|---|---|
| Example 4 | — | $3.2 \times 10^{-5}$ | $4.1 \times 10^{-5}$ | $4.9 \times 10^{-5}$ |
| Example 6 | — | $3.4 \times 10^{-5}$ | $4.6 \times 10^{-5}$ | $5.5 \times 10^{-5}$ |
| Comparative Example A | Top-Chem-2000 | $1.5 \times 10^{-5}$ | $1.8 \times 10^{-5}$ | $2.2 \times 10^{-5}$ |
| Comparative Example C | Durlon 9000 | $3.7 \times 10^{-5}$ | $4.9 \times 10^{-5}$ | $6.1 \times 10^{-5}$ |
| Comparative Example D | Sealon | $4.1 \times 10^{-5}$ | $5.3 \times 10^{-5}$ | $6.5 \times 10^{-5}$ |
| Comparative Example E | Tealon 1580 | $4.4 \times 10^{-5}$ | $6.3 \times 10^{-5}$ | $7.7 \times 10^{-5}$ |
| Comparative Example F | Tealon 1590 | $5.1 \times 10^{-5}$ | $7.0 \times 10^{-5}$ | $8.5 \times 10^{-5}$ |

The data in Table 8 illustrates the low COTE exhibited by articles formed from the compositions of the present invention. This allows the articles to be used in high temperature conditions without significant deformation. This correspondingly increases the product lives of the articles during use. Only the gasket of Comparative Example A exhibited better COTE results. However, as discussed above, Comparative Example A is Top-Chem-2000, which uses a fine-powder-grade PTFE that requires expensive extrusion processing systems to form products. In contrast, granular-grade PTFEs of the composition of the present invention may use compression molding and sintering, which are less expensive.

Examples 7-10

Examples 7-10 are compositions of the present invention, with component concentrations (in weight percent) of granular-grade PTFE (e.g., TF 1620) and low-density microspheres (e.g., S60HS and S60 microspheres) as provided in Table 9. Articles were formed from by compression molding and sintering the compositions pursuant to the given ASTMs discussed below, except that the compression pressure was 10 MPa (1450 psi).

TABLE 9

| Example | TF 1620 | S60HS | S60 |
|---|---|---|---|
| Example 7 | 90 | 10 | 0 |
| Example 8 | 90 | 0 | 10 |
| Example 9 | 70 | 30 | 0 |
| Example 10 | 70 | 0 | 30 |

Articles formed from the compositions of examples 7-10 were quantitatively measured for specific gravity, shrinkage, tensile strength, tensile elongation, and hardness. Table 10

The data in Table 10 further illustrates the good physical properties of articles formed from the compositions of the present invention. In particular, articles formed from the compositions of Examples 7 and 8 (90% TF 1620) exhibited high tensile strengths and tensile elongations.

Although the present invention has been described with reference to preferred embodiments, workers skilled in the art will recognize that changes may be made in form and detail without departing from the spirit and scope of the invention.

The invention claimed is:

1. A composition comprising:
   granular-grade polytetrafluoroethylene; and
   a plurality of microspheres, wherein the plurality of microspheres has an average specific gravity less than about 0.9 grams per cubic centimeter.

2. The composition of claim 1, wherein the granular-grade polytetrafluoroethylene has an average particle size ranging from about 5 micrometers to about 500 micrometers.

3. The composition of claim 2, wherein the granular-grade polytetrafluoroethylene has an average particle size ranging from about 10 micrometers about 50 micrometers.

4. The composition of claim 1, wherein the plurality of microspheres constitutes about 1% to about 45% by weight of the composition, based on the entire weight of the composition.

5. The composition of claim 4, wherein the plurality of microspheres constitutes about 20% to about 30% by weight of the composition, based on the entire weight of the composition.

6. The composition of claim 1, wherein the plurality of microspheres has an average particle size ranging from about 10 micrometers about 70 micrometers.

7. The composition of claim 1, wherein the plurality of microspheres exhibits an average crush strength of at least about 69 megapascals.

8. The composition of claim 7, wherein the plurality of microspheres exhibits an average crush strength of at least about 117 megapascals.

9. The composition of claim 1, wherein the plurality of microspheres exhibits an average crush strength-to-density ratio of at least about 100 megapascals-cubic centimeters/gram.

10. The composition of claim 9, wherein the plurality of microspheres exhibits an average crush strength-to-density ratio of at least about 200 megapascals-cubic centimeters/gram.

11. The composition of claim 1, wherein the composition is compression moldable, sinterable, or combinations thereof.

12. The composition of claim 1, wherein the plurality of microspheres comprises glass microspheres.

13. A composition comprising:
    granular-grade polytetrafluoroethylene; and
    a plurality of microspheres, wherein the plurality of microspheres exhibits an average crush strength-to-density ratio of at least about 100 megapascals-cubic centimeters/gram.

14. The composition of claim 13, wherein the plurality of microspheres exhibits an average crush strength-to-density ratio of at least about 200 megapascals-cubic centimeters/gram.

15. The composition of claim 13, wherein the plurality of microspheres constitutes about 1% to about 45% by weight of the composition, based on the entire weight of the composition.

16. The composition of claim 15, wherein the plurality of microspheres constitutes about 20% to about 30% by weight of the composition, based on the entire weight of the composition.

17. The composition of claim 13, wherein the composition is compression moldable, sinterable, or combinations thereof.

18. The composition of claim 13, wherein the plurality of microspheres comprises glass microspheres.

* * * * *